(12) United States Patent
Kosugi et al.

(10) Patent No.: US 7,044,281 B2
(45) Date of Patent: May 16, 2006

(54) CLUTCH ENGAGEMENT CONTROL SYSTEM

(75) Inventors: Makoto Kosugi, Iwata (JP); Toru Zenno, Iwata (JP); Masaichi Yamada, Iwata (JP)

(73) Assignee: Yamaha Motor Co., Ltd., Iwata (JP)

( * ) Notice: Subject to any disclaimer, the term of this patent is extended or adjusted under 35 U.S.C. 154(b) by 0 days.

(21) Appl. No.: 10/985,230

(22) Filed: Nov. 10, 2004

(65) Prior Publication Data

US 2005/0167232 A1 Aug. 4, 2005

Related U.S. Application Data

(63) Continuation of application No. PCT/JP03/05609, filed on May 2, 2003.

(30) Foreign Application Priority Data

May 10, 2002 (JP) ............................. 2002-135667

(51) Int. Cl.
*F16D 48/08* (2006.01)
*F16D 25/08* (2006.01)

(52) U.S. Cl. ............... 192/52.1; 192/103 F; 192/109 F
(58) Field of Classification Search ............... 192/52.1, 192/54.1, 103 F, 109 F, 91 A, 96, 85 CA; 477/180

See application file for complete search history.

(56) References Cited

U.S. PATENT DOCUMENTS

| | | | | |
|---|---|---|---|---|
| 4,874,070 A * | 10/1989 | Nellums et al. | ............... | 477/84 |
| 6,223,874 B1 * | 5/2001 | Wheeler | ............... | 192/103 F |
| 6,309,325 B1 * | 10/2001 | Baer et al. | ............... | 477/174 |
| 6,319,173 B1 * | 11/2001 | Patel et al. | ............... | 477/180 |
| 6,364,813 B1 * | 4/2002 | Patel et al. | ............... | 477/174 |
| 6,397,998 B1 * | 6/2002 | Wheeler et al. | ............... | 192/85 CA |

FOREIGN PATENT DOCUMENTS

| | | |
|---|---|---|
| JP | 61-223339 | 10/1986 |
| JP | 04-271987 | 9/1992 |
| JP | 05-310175 | 11/1993 |
| JP | 11-059555 | 3/1999 |
| JP | 2000-039036 | 2/2000 |

* cited by examiner

*Primary Examiner*—Rodney H. Bonck
(74) *Attorney, Agent, or Firm*—Knobbe, Martens, Olson & Bear, LLP (57) ABSTRACT

A clutch engagement control system 100 for engaging a friction clutch 1 by means of an actuator 3, can comprise a magnetostrictive sensor 71 for detecting the state of power transmission over the friction clutch 1, and can be configured to engage the friction clutch 1 at first engagement velocity until the magnetostrictive sensor 71 detects the start of the power transmission, and to change the engaging velocity to second engagement velocity lower than the first engagement velocity when the magnetostrictive sensor 71 detects the start of the power transmission such that the friction clutch 1 starts transmitting power after no power transmitted over the friction clutch 1, and the power transmissibility is gradually enhanced.

18 Claims, 5 Drawing Sheets

CLUTCH ENGAGEMENT CONTROL SYSTEM

PRIORITY INFORMATION

The present application is a continuation of PCT Application No. PCT/JP03/05609, filed on May 2, 2003, which claims priority under 35 U.S.C. § 119 to Japanese Patent Application No. 2002-135667, filed on May 10, 2002, and the entire contents of both of which are expressly incorporated by reference herein.

BACKGROUND OF THE INVENTION

1. Field of the Invention

The present inventions relate to a clutch engagement control system, and more specifically, to a clutch engagement control system that can reduce the time required for engaging the friction clutch by increasing velocity to engage the friction clutch until the friction clutch starts transmitting power.

2. Background Art

Figure 4:
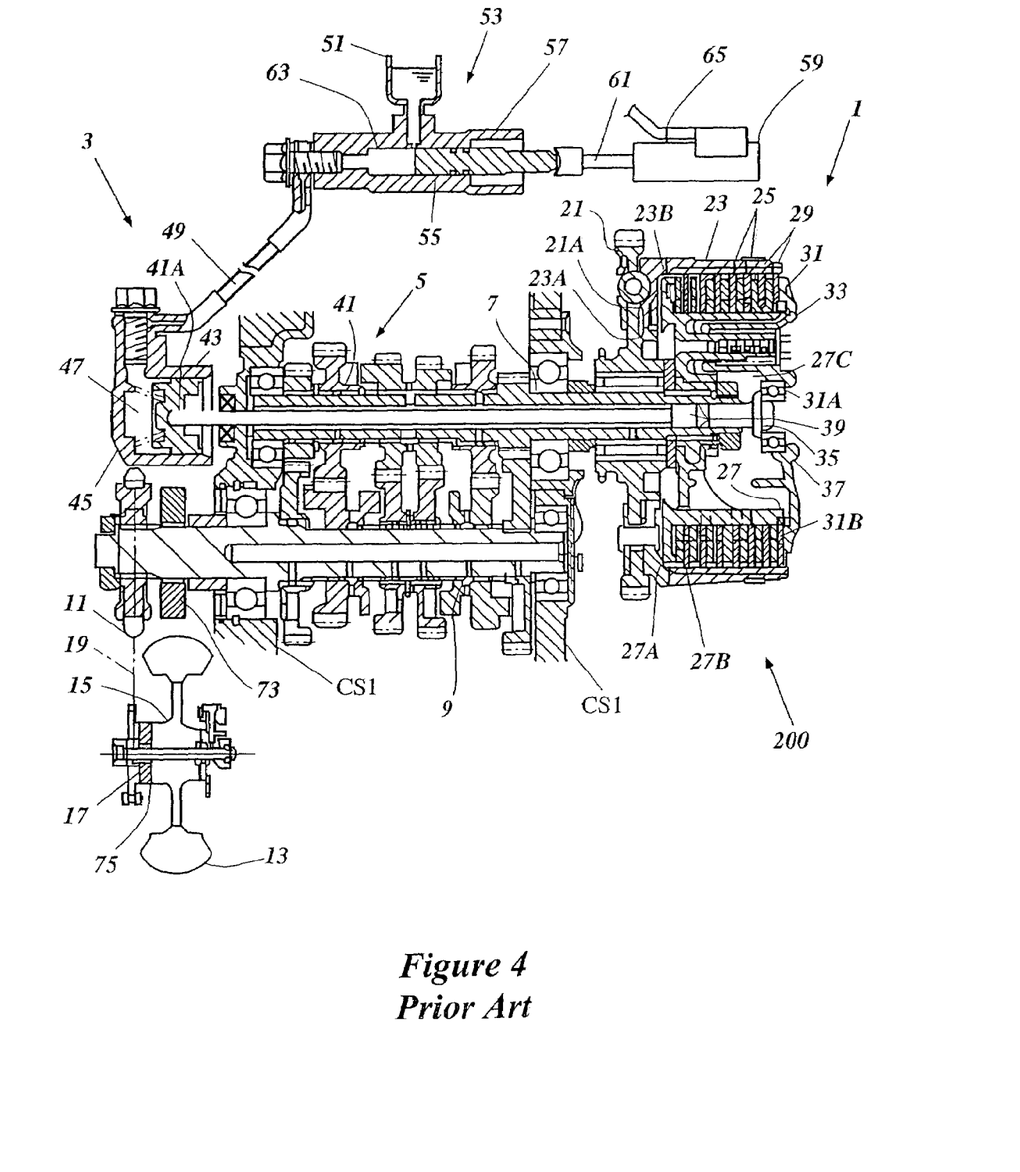
FIG. 4 is a schematic sectional view illustrating the conventional clutch engagement control system.

FIG. 4 is a schematic sectional view illustrating a conventional clutch engagement control system 200.

The conventional clutch engagement control system 200 controls engagement of a friction clutch 1 used for motorcycles by means of an actuator 3 The friction clutch 1 is engaged or disengaged to transmit or not to transmit torque from an engine crankshaft (not shown) to a mission shaft 7 made up of a drive shaft of a multistage transmission 5, a type of transmission. Torque transmitted to the mission shaft 7 is transmitted to a countershaft 9 interlocked with the mission shaft 7 via the multistage transmission 5.

The torque transmitted to the countershaft 9 is further transmitted to a rear wheel 13, which is a drive wheel of the motorcycle, via a countershaft sprocket 11. The countershaft sprocket 11 is integrally provided with the countershaft 9 on one end of the countershaft 9. A rear wheel sprocket 17 supporting the rear wheel 13 and integrally provided with a rear wheel shaft 15 transmits drive torque to the rear wheel 13. A chain 19 wrapped around the countershaft sprocket 11 and the rear wheel sprocket 17 transmits torque from the countershaft sprocket 11 to the rear wheel sprocket 17.

The mission shaft 7 and the countershaft 9 are rotatably disposed in an engine gearcase CS1 for the motorcycle while the shaft of the rear wheel 13 is rotatably disposed for free rotation on a frame body (see FIG. 3) for the motorcycle.

The friction clutch 1 is configured to gradually transmit the drive force (torque) produced by the engine to the multistage transmission 5 to allow the motorcycle to smoothly start, and to temporarily disengage the power transmitted between the engine and the multistage transmission 5 to allow gear changes.

The friction clutch 1 may be a multiplate friction clutch For example, friction clutch 1 can comprise an outer driver 23 integrally provided with a gear 21 that engages with a gear (not shown) integrally supported by the engine crankshaft and that is disposed for free rotation around the mission shaft 7. As such, the mission shaft 7 receives torque transmitted from the crankshaft A plurality of friction discs 25 or friction plates are integrally mounted to the outer driver 23. A plurality of clutch plates 29 or friction plates are integrally mounted to an inner driver 27. The inner driver 27 receives torque transmitted from the outer driver 23 by frictional force generated between the plurality of friction discs 25 and the plurality of clutch plates 29.

The gear 21 is provided for free rotation on one end of the mission shaft 7. The outer driver 23, mounted integrally to a boss portion of the gear 21, is restricted to displace the mission shaft 7 in the rotational axis direction while being rotatable around the mission shaft 7. The inner driver 27 is mounted integrally to one end of the mission shaft 7 (furthest end from the gear 21).

The friction clutch 1 may be a multiplate friction clutch. For example, friction clutch 1 can comprise an outer driver 23 integrally provided with a gear 21 that engages with a gear (not shown) integrally supported by the engine crankshaft and that is disposed for free rotation around the mission shaft 7. As such, the mission shaft 7 receives torque transmitted from the crankshaft. A plurality of friction discs 25 or friction plates are integrally mounted to the outer driver 23. A plurality of clutch plates 29 or friction plates are integrally mounted to an inner driver 27. The inner driver 27 receives torque transmitted from the outer driver 23 by frictional force generated between the plurality of friction discs 25 and the plurality of clutch plates 29.

The cylindrical outer driver 23 has an opening on its one end, which is provided with an engaging portion 23B having an engaging hole 23A that engages with a circular engaging projection 21A disposed in the boss portion of the gear 21. The engaging portion 23B having the engaging hole 23A allows the outer driver 23 to be fixed concentrically to the gear 21.

The friction discs 25 are ring-shaped thin plates and an outer peripheral edge of each friction disc 25 is supported by an inner periphery of the cylindrical outer driver 23 such that the plane of each friction disc 25 is generally perpendicular to the rotational axis direction of the mission shaft 7. Such support allows each friction disc 25 to be slightly movable in the rotational axis direction of the mission shaft 7 relative to the outer driver 23 while its rotation in the rotational direction of the mission shaft 7 relative to the outer driver 23 is restricted A predetermined space (with a little longer length than the thickness of the clutch plate 29) is defined between the adjacent planes of the friction discs 25.

The cylindrical inner driver 27 has an opening on one end provided with a circular flange 27A having approximately same outside diameter as the clutch plate 29, and also supports the plurality of clutch plates 29 with its cylindrical outer periphery. Such support allows each clutch plate 29 to be slightly movable in the rotational axis direction of the mission shaft 7 relative to the inner driver 27 while restricts its rotation in the rotational direction of the mission shaft 7 relative to the inner driver 27.

The inner driver 27 is fixed to one end of the mission shaft 7 with its flange 27A located on the side of the engaging portion 23B of the outer driver 23.

The clutch plates 29 are ring shaped thin plates, and an inner peripheral edge of each clutch plate 29 is supported with an outer periphery of the cylindrical inner driver 27 as described above such that the plane of each clutch plate 29 is generally perpendicular to the rotational axis direction of the mission shaft 7.

A predetermined space (with a little longer length than the thickness of the friction disc 25) is defined between the adjacent planes of the clutch plates 29.

Each of the clutch plates 29 has an outside diameter slightly smaller than the inside diameter of the cylindrical outer driver 23. Each of the friction discs 25 has an inner diameter slightly larger than the outside diameter of the cylindrical inner driver 27.

The friction discs 25 and the clutch plates 29 are alternately located in the rotational axis direction of the mission shaft 7. A small space is defined in the rotational axis direction of the mission shaft 7 between each friction disc 25 and clutch plate 29.

A pressing portion 27B including the flange 27A of the inner driver 27, is provided on outer sides of each friction disc 25 and clutch plate 29 located alternately as described above as well as on outer sides of the rotational axis direction of the mission shaft 7 and on the side of the engaging portion 23B of the outer driver 23. The friction discs 25 and the clutch plates 29 are interposed between the pressing portion 27B and a pressure plate 31, to be discussed later, in the rotational axis direction of the mission shaft 7 to generate frictional force between each friction disc 25 and clutch plate 29. The pressing portion 27B is generally a plane approximately parallel to each plane of the friction discs 25 and the clutch plates 29.

The friction clutch 1 is provided with a circular pressure plate 31 on the outsides of each friction disc 25 and clutch plate 29 located alternately as described above as well as on the outer sides of the rotational direction of the mission shaft 7 and on the opposite side of the engaging portion 23B of the outer driver 23.

The pressure plate 31 is provided with a plurality of guide portions 31A disposed integrally with the cylindrical inner driver 27 inside of the inner driver 27 and engaging with plural cylindrical guide portions 27C which extend in the rotational axis direction of the mission shaft 7. The guide portions 27C and the guide portions 31A allow the pressure plate 31 to be located movably in the rotational axis direction of the mission shaft 7 relative to the inner driver 27 as well as to rotate together with the inner driver 27.

The pressure plate 31 has a plane pressing portion 31B approximately parallel to each plane of the friction discs 25 and the clutch plates 29.

Plural compression springs 33 are provided so as to respectively enclose the plurality of cylindrical guide portions 27C. The pressure plate 31 is urged by each compression spring 33 in the direction in which the pressing portion 31B of the pressure plate 31 approaches the pressing portion 27B of the inner driver 27.

When the friction clutch I is being engaged, the pressure plate 31 is displaced and urged toward the flange 27A of the inner driver 27 by the compression springs 33. The friction discs 25 and the clutch plates 29 are interposed and pressed between the pressing portion 27B of the inner plate 27 and the pressing portion 31B of the pressure plate 31 to generate frictional force between each friction disc 25 and clutch plate 29. This allows torque to be transmitted from the outer driver 23 to the inner driver 27.

On the other hand, when the friction clutch 1 is being disengaged (being disconnected and with no torque transmitted), the pressure plate 31 is displaced rightward in FIG. 4 (in the direction in which the pressing portion 31B of the pressure plate 31 is displaced apart from the pressing portion 27B of the inner driver 27) by a push rod 35 discussed later. The pressing portion 31B of the pressure plate 31 is spaced apart from the friction disc 25 positioned rightmost in FIG. 4 (positioned adjacent to the pressing portion 31B of the pressure plate 31).

When the friction clutch 1 is being engaged, the pressure plate 31 is displaced and urged toward the flange 27A of the inner driver 27 by the compression springs 33. The friction discs 25 and the clutch plates 29 are interposed and pressed between the pressing portion 27B of the inner plate 27 and the pressing portion 31B of the pressure plate 31 to generate frictional force between each friction disc 25 and clutch plate 29. This allows torque to be transmitted from the outer driver 23 to the inner driver 27.

Next will be described the conventional clutch engagement control system 200.

The conventional clutch engagement control system 200 comprises the actuator 3. The actuator 3 and the compression springs 33 displace the pressure plate 31 in the rotational axis direction of the mission shaft 7. Based on the displacement, the friction clutch 1 is engaged (with torque transmitted) or disengaged (with no torque transmitted).

The pressure plate 31 has a center portion engaging with one end of the push rod 35 via a deep groove ball bearing 37, for example, and also can rotate around the push rod 35. The other end of the push rod 35 engages with one end of the cylindrical mission shaft 7 positioned inside thereof.

When force larger than the urging force produced by the compression springs 33 displaces the push rod 35 rightward in FIG. 4 (in the rotational axis direction of the mission shaft 7 in which the pressing portion 31B of the pressure plate 31 is spaced apart from the pressing portion 27B of the inner driver 27), the push rod 35 pushes and displaces the pressure plate 31 in the same manner accordingly.

On the other hand, when the push rod 35 is displaced leftward in FIG. 4, the pressure plate 31 pushes the push rod 35 by urging force produced by the compression springs 33 and is also displaced in the same manner.

Inside the cylindrical mission shaft 7, a ball 39 is disposed adjacent to the other end of the push rod 35 and a push rod 41 is disposed adjacent to the ball 39.

The push rod 41 has one end 41A protruding from the other end (the end opposite to the one provided with the inner driver 27) of the cylindrical mission shaft 7.

The protruding end 41A of the push rod 41 is integrally provided with a piston 43 which is included in the actuator 3. The piston 43 is guided by a cylinder body 45 and is slidable in the rotational axis direction of the mission shaft 7.

When hydraulic oil as compressed fluid is supplied to a space 47 enclosed by the piston 43 and the cylinder body 45, the piston 43 is pressed and displaced rightward in FIG. 4. Accordingly, the pressure plate 31 is pressed rightward in FIG. 4 (in the rotational axis direction of the mission shaft 7 in which the pressing portion 31B of the pressure plate 31 is spaced apart from the pressing portion 27B of the inner driver 27) via the push rod 41, the ball 39, the push rod 35 and the deep groove ball bearing 37.

As described above, when the pressure plate 31 is pressed rightward in FIG. 4 and the pressing portion 31B of the pressure plate 31 is spaced apart from the friction discs 25, the friction clutch 1 is disengaged.

When the hydraulic oil supplied is gradually drained out of the enclosed space 47 with the friction clutch 1 being disengaged, the piston 43 is gradually displaced leftward in FIG. 4 (in the direction in which the volume of the space 47 decreases).

The reason for this displacement is because the pressure plate 31 is normally urged by the compression springs 33 so as to be displaced leftward in FIG. 4 (in the rotational axis direction of the mission shaft 7 in which the pressing portion 31B of the pressure plate 31 approaches the pressing portion 27B of the inner driver 27). This urging force also allows the piston 43 to normally be urged leftward as viewed in FIG. 4, via the deep groove ball bearing 37, the push rod 35, the ball 39 and the push rod 41.

When the piston 43 is gradually displaced leftward in FIG. 4 as described above, the pressure plate 31 is also gradually displaced leftward in FIG. 4. The pressing portion 31B of the pressure plate 31 then touches the nearest friction disc 25 of the friction discs 25, allowing the friction clutch 1 to start being engaged. Thus, the friction clutch 1 starts transmitting power.

When the piston 43 is further displaced leftward in FIG. 4, the pressure force of the pressure plate 31 toward the friction discs 25 increases. In other words, this allows the pressing portion 27B of the inner driver 27 and the pressing portion 31B of the pressure plate 31 to clamp the friction discs 25 and the clutch plates 29 with increased force. Subsequently sliding between the friction discs 25 and the clutch plates 29 stops, and at that time, the friction clutch 1 is fully engaged.

Decreasing the pressure of the hydraulic oil in the space 47 enclosed by the piston 43 and the cylinder body 45 with the friction clutch 1 fully engaged allows the piston 43 and the push rod 41 to be further displaced leftward in FIG. 4. The push rod 41 and the ball 39 may then be spaced apart from each other. Even in such case, the position of the pressure plate 31 relative to the inner driver 27 stays nearly the same as in the case that the friction clutch 1 is fully engaged, or almost remains unchanged.

Supply or drainage of hydraulic oil to or from the space 47 enclosed by the piston 43 and the cylinder body 45 is performed through a master cylinder 53 comprising a reserve tank 51 and connected to the space 47 via a hydraulic oil passage 49 made up of pipes.

The master cylinder 53 comprises a master cylinder body 57 and a piston 55 engaging and sliding with the master cylinder body 57. The piston 55 has one end protruding outward of the master cylinder body 57. The piston 55 also has an end face of the end touching one end face of an output shaft 61 of a small actuator 59.

The small actuator 59 including a small hydraulic cylinder and a small control motor operates under the control of a control device (not shown) comprising, for example, a ROM and a CPU for controlling the operations of the small actuator 59 based on the control patterns preset therein.

When the friction clutch 1 is disengaged, the output shaft 61 of the small actuator 59 is displaced leftward in FIG. 4 (in the direction in which the output shaft 61 protrudes). The displacement of the output shaft 61 allows the piston 55 to be pressed leftward in FIG. 4. Therefore, the volume in a space 63 enclosed by the master cylinder body 57 and the piston 55 decreases. This decrease in volume allows the hydraulic oil staying in the space 63 to run through the hydraulic oil passage 49 and to be supplied to the space 47 enclosed by the cylinder body 45 and the piston 43. The piston 43 is then displaced rightward in FIG. 4.

The rightward displacement of the piston 43 allows the pressure plate 31 to be pressed rightward in FIG. 4 via the push rod 41, the ball 39, the push rod 35, and the deep groove ball bearing 37. This pressed force is larger than force produced by the compression springs 33 to urge the pressure plate 31 leftward in FIG. 4, which results in rightward displacement of the pressure plate 31 in FIG. 4. The pressing portion 31B of the pressure plate 31 is spaced apart from the friction discs 25, and the friction clutch 1 is then disengaged.

Next, description will be made of the example in which the friction clutch 1 is reengaged.

When the friction clutch 1 is being disengaged, the piston 43 of the actuator 3 presses the pressure plate 31 rightward in FIG. 4 via the push rod 41, the ball 39, the push rod 35 and the deep groove ball bearing 37. The pressing portion 31B of the pressure plate 31 remains apart from the friction discs 25. Even under this condition, the pressure plate 31 is urged leftward in FIG. 4 by the compression springs 33 so that the piston 43 is urged leftward in FIG. 4 via the deep groove ball bearing 37, the push rod 35, the ball 39 and the push rod 41.

The urged piston 43 further allows the piston 55 of the master cylinder 53 to be urged rightward in FIG. 4 (in the direction in which the piston 55 presses the output shaft 61 of the small actuator 59) via the hydraulic oil running from the hydraulic passage 49.

When the output shaft 61 of the small actuator 59 is gradually displaced rightward in FIG. 4 (in the direction in which the output shaft 61 retracts into a small actuator body 65) with the friction clutch 1 being disengaged, the piston 55 pressed by the output shaft 61 of the small actuator 59 is accordingly displaced rightward in FIG. 4. The displacement of the piston 55 results in a flow of hydraulic oil from the space 47 enclosed by the cylinder body 45 and the piston 43 to the space 63 enclosed by the master cylinder body 57 and the piston 55 through the hydraulic oil passage 49.

The displacement of hydraulic oil allows the piston 43 urged by the pressure plate 31 and the compression springs 33 to be gradually displaced leftward in FIG. 4. Accordingly, the pressure plate 31 is also gradually displaced leftward in FIG. 4 and shortly starts engaging the friction clutch 1 (start transmitting power). When the pressure plate 31 is further displaced leftward in FIG. 4, the urging force produced by the compression springs 33 results in increased frictional force generated between the friction discs 25 and the clutch plates 29. Slipping between the friction discs 25 and the clutch plates 29 further reduces, and then the friction clutch I is fully engaged.

The cylinder body 45 of the actuator 3, the master cylinder body 57 of the master cylinder 53, and the small actuator body 65 of the small actuator 59 are fixed integrally, for example, to the engine gear case CS1 respectively.

The displacement of hydraulic oil allows the piston 43 urged by the pressure plate 31 and the compression springs 33 to be gradually displaced leftward in FIG. 4. Accordingly, the pressure plate 31 is also gradually displaced leftward in FIG. 4 and shortly starts engaging the friction clutch 1 (starts transmitting power). When the pressure plate 31 is further displaced leftward in FIG. 4, the urging force produced by the compression springs 33 results in increased frictional force generated between the friction discs 25 and the clutch plates 29. Slipping between the friction discs 25 and the clutch plates 29 further reduces, and then the friction clutch 1 is fully engaged.

Next will be described the engagement velocity at which the conventional clutch engagement control system 200 reengages the friction clutch 1.

Figure 5:
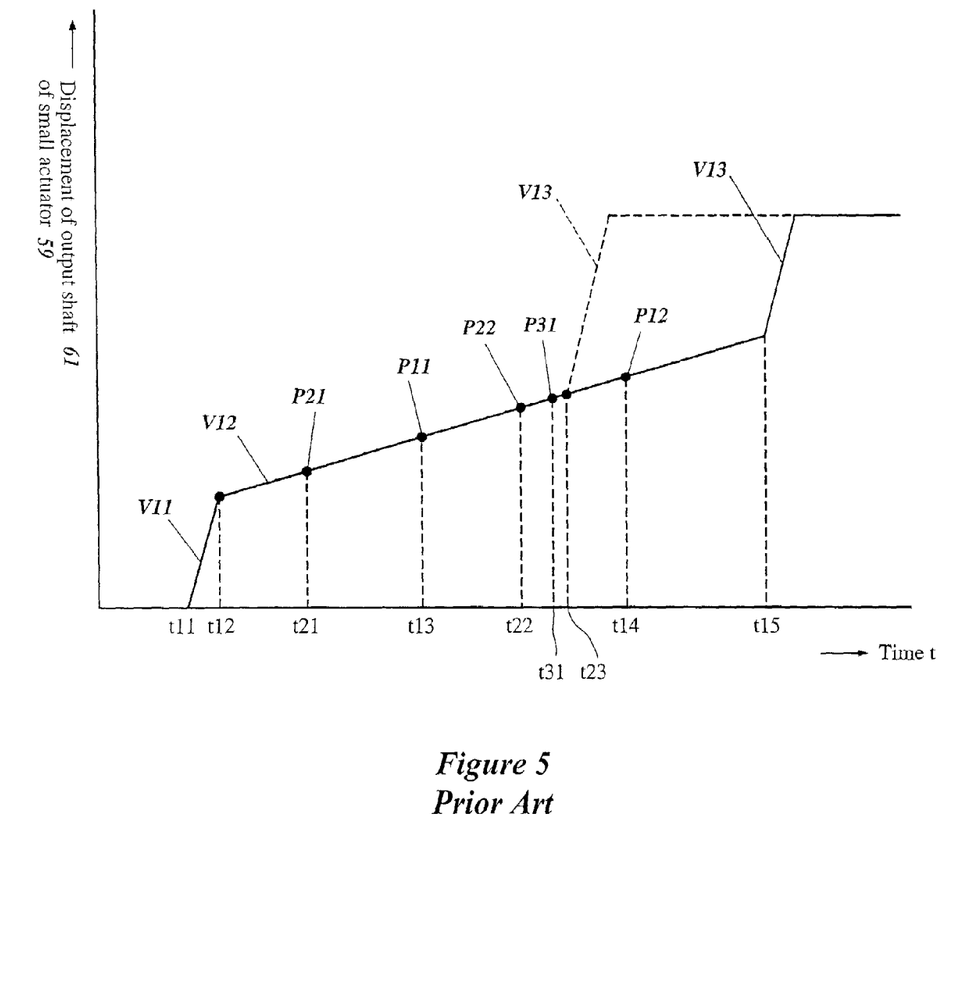
FIG. 5 illustrates an example of engagement velocity at which the friction clutch is reengaged by the conventional clutch engagement control system.

FIG. 5 illustrates an example of engagement velocity at which the conventional clutch engagement control system 200 reengages the friction clutch 1.

The horizontal axis and the vertical axis of FIG. 5 represent elapsed time and displacement of the output shaft 61 of the small actuator 59, respectively. The upward (positive) direction in the vertical axis of FIG. 5 corresponds to the rightward displacement of the output shaft 61 in FIG. 4 (in the direction in which the output shaft 61 retracts into the small actuator body 65).

For example, when the friction clutch I is reengaged to start the motorcycle moving, the output shaft 61 starts to be displaced rightward in FIG. 4 at time t11 and continues to be displaced at relatively high velocity, V11, until time t12. Until the motorcycle starts moving, the gear 21, the outer driver 23 and the friction discs 25 shown in FIG. 4 are rotating according to the engine rotation while the clutch plates 29, the inner driver 27 and the pressure plate 31 are not rotating.

When the friction clutch 1 is being disengaged, normally there is a gap of approximately 2 mm between the pressing portion 31B of the pressure plate 31 shown in FIG. 4 and the friction disc 25 positioned rightmost in FIG. 4. The reason for the displacement at high velocity, V11, is to reduce the time required for engaging the friction clutch 1, which is achieved by displacing the pressing portion 31B by the major portion of the distance in the gap at as high a velocity as possible.

For example, when the friction clutch 1 is reengaged to start the motorcycle moving, the output shaft 61 starts to be displaced rightward in FIG. 4 at the time ti1 and continues to be displaced at relatively high velocity, Vii, until time t12. Until the motorcycle starts moving, the gear 21, the outer driver 23 and the friction discs 25 shown in FIG. 4 are rotating according to the engine rotation while the clutch plates 29, the inner driver 27, and the pressure plate 31 are not rotating.

The rightward displacement of the output shaft 61 in FIG. 4 continues at velocity V12. This allows the pressure plate 31 to be displaced in the direction (leftward in FIG. 4) so as to approach the pressing portion 27B of the inner driver 27 at velocity corresponding to the velocity V12 (or at velocity corresponding to the ratio between pressed areas of the piston 57 of the master cylinder 53 and of the piston 43 of the actuator 3). Then, the point to start engaging the clutch, P11, is reached at t13.

At the point to start engaging the clutch, P11, the pressing portion 31B of the pressure plate 31 touches the friction disc 25 (positioned adjacent to the pressing portion 31B) and torque starts to be transmitted between the friction discs 25 and the pressure plates 29.

Then, the rightward displacement of the output shaft 61 in FIG. 4 further continues at velocity V12, which results in a moderate enhancement of power transmissibility between the friction discs 25 and the pressure plates 29. The point at which the clutch is fully almost engaged with almost no slipping therebetween, P12, is reached at time t14. Following that, the displacement velocity of the output shaft 61 is increased to velocity V13 after a predetermined time period, that is, at time t15.

The point to start engaging the clutch, P11, varies depending on temperature as well as on how much the friction discs 25 and the clutch plates 29 wear out by engaging and disengaging the friction clutch 1.

If the point to start engaging the clutch varies from P11 at time t13 to P21 at t21, the point at which the clutch is fully engaged, P22, is also reached earlier, at time t22 before the point P12, due to the earlier start of clutch engagement. Thus, the displacement velocity of the output shaft 61 may be increased at time t23 to velocity V13 as shown by dashed lines in FIG. 5.

However, the point to start engaging the clutch varies depending on temperature as described above, there may be a case where the point to start engaging the clutch is delayed to P31 at time t31. In this case, if the output shaft 61 of the small actuator 59 is still displaced at high velocity, V13, at time t23 as shown by dashed lines in FIG. 5, the pressing portion 31B of the pressure plate 31 suddenly presses the friction discs 25 before the friction clutch 1 is fully connected, that is, before the friction clutch 1 is fully engaged. Then, the friction clutch 1 is suddenly connected, in other words, the friction clutch 1 is suddenly and fully engaged.

This sharply increases the rotational speed of the rear wheel 13 connected to the engine (not shown) via the mission shaft 7 and the countershaft 9 and causes shock when the motorcycle starts.

In other situations, the engine can be stopped due to a sharp increase in load applied to the engine.

Therefore, the conventional clutch engagement control system 200 allows sufficient time between times t12 and t15, by using a long preset time period between times t12 and t15.

The above description of FIG. 5 indicates that the engagement velocity of the friction clutch 1 is represented on the vertical axis so as to designate the displacement of the output shaft 61 of the small actuator 59. But it is not limited to that.

For example, the graph of FIG. 5 can also be used to represent the engagement velocity of other components For example, FIG. 5 can be used to represent the displacements of the pressure plate 31, the push rod 35 and the push rod 41 in the rotational axis direction of the mission shaft 7, and the displacements of the piston 43 of the actuator 3 and that of the piston 57 of the master cylinder 53.

However, using parameters other than the displacement of the output shaft 61 of the small actuator 59 to indicate the engagement velocity of the friction clutch 1 results in almost no positive value of the velocity V13 in FIG. 5 (the portion showing the velocity of the output shaft 61 after the friction clutch 1 was fully engaged).

The reason for an almost zero value is because the pressure plate 31 is no longer displaced after the friction clutch 1 is fully engaged. Accordingly, the push rod 35 is no longer pressed and displaced by the pressure plate 31.

In order to allow the conventional clutch engagement control system 200 to perform engagement control of the friction clutch 1 without shock for engaging the clutch, even if the point to start engaging the friction clutch varies depending on temperature, a relatively long time is required to slowly displace the pressure plate 31 at around the point to start engaging the clutch.

In the example of the conventional system, the description is made of the problems when the motorcycle starts, however, using the multistage transmission 5 for shifting gears also causes the same problems.

SUMMARY OF THE INVENTION

An aspect of at least one of the inventions disclosed herein includes the realization that a clutch engagement control system can be improved by controlling the engagement of the clutch based on the detection of the beginning of power output from the clutch.

In accordance with one embodiment, a clutch engagement control system for engaging a friction clutch by means of an actuator, comprises detecting means for detecting the state of power transmission from the friction clutch, and control means for controlling the actuator so as to engage the friction clutch at first engagement velocity until the detecting means detects the start of power transmission from the clutch, and to change the engagement velocity to second engagement velocity lower than the first engagement velocity when the detecting means detects the start of the power transmission such that the friction clutch starts transmitting power after no power transmitted from the friction clutch, and the power transmissibility is gradually enhanced.

In accordance with another embodiment, a clutch engagement control system for engaging a friction clutch with an actuator, comprising a sensor configured to detect power output from the friction clutch, and a controller configured to control the actuator so as to engage the friction clutch at first engagement velocity until the sensor detects the start of the power output, and to change the engagement velocity to second engagement velocity lower than the first engagement velocity when the sensor detects the start of the power output.

In accordance with another embodiment, a method for engaging a friction clutch with an actuator is provided. The method comprises detecting power output from the friction clutch, engaging the friction clutch at first engagement velocity until the start of the power output from the friction clutch, and changing the engagement velocity to second engagement velocity lower than the first engagement velocity when the sensor detects the start of the power output

DETAILED DESCRIPTION OF THE PREFERRED EMBODIMENT

Figure 1:
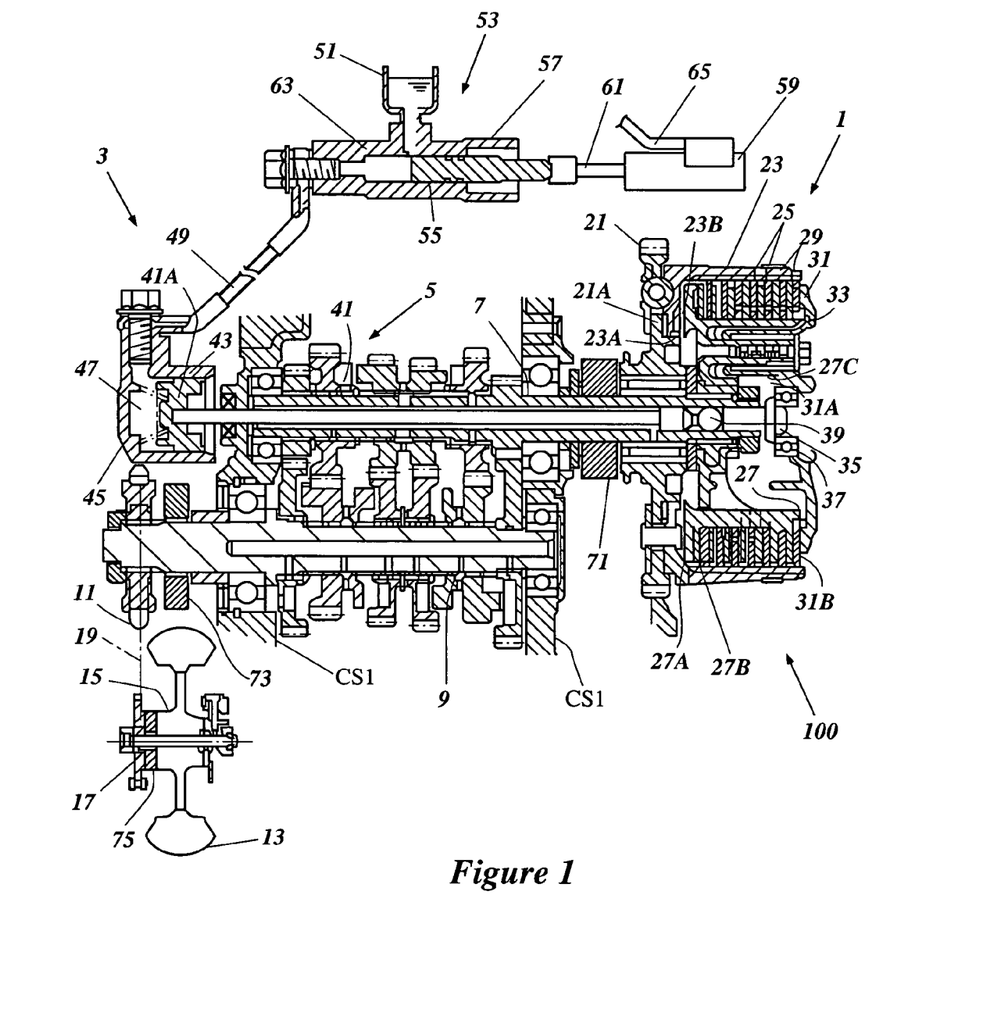
FIG. 1 is a schematic sectional view illustrating a clutch engagement control system according to an embodiment.

FIG. 1 is a schematic sectional view illustrating a clutch engagement control system 100 according to an embodiment of the present invention.

The clutch engagement control system 100 is constructed almost the same as the conventional clutch engagement control system 200 except having a sensor 71 for detecting torque generated on the mission shaft 7.

Description will here be made of a magnetostrictive sensor 71 as an example of a torque sensor for detecting torque generated on the mission shaft 7. However, other sensors can also be used.

Ferromagnetic materials such as iron or nickel are placed in a magnetic field, which causes distortion and change in dimension thereof. On the other hand, when ferromagnetic materials are subjected to distortion, the magnetization characteristics thereof change. The magnetostrictive sensor detects load and torque applied to the ferromagnetic materials by means of the phenomenon through which the magnetization characteristics thereof change.

The mission shaft 7 can be comprised of ferromagnetic materials made of iron, steel, nickel or their alloys. The mission shaft 7 can also be magnetized in the rotational axis direction. When the motorcycle starts, for example, engagement of the friction clutch 1 starts, which generates torque on the mission shaft 7 and accordingly torsion on the mission shaft 7. The magnetostrictive sensor 71 detects magnetization components in the circumferential direction of the mission shaft 7 resulted from the torsion described above, thereby detecting the torque generated on the mission shaft 7. The magnetostrictive sensor, in such a configuration, can be referred to as a magnetostrictive torque meter.

In FIG. 1, the magnetostrictive sensor 71 is placed between the engine gearcase CS1 positioned on the side of the friction clutch 1 and the gear 21 engaged with the engaging portion of the outer driver 23 of the friction clutch 1 so as to enclose the mission shaft 7. But, the position of the magnetostrictive sensor 71 is not limited to that. The magnetostrictive sensor 71 can be placed in any position where torque (torsional moment) applied to the mission shaft 7 can be detected.

The clutch engagement control system 100 operates almost in the same manner as the conventional clutch engagement control system 200. However, under the control of the clutch engagement control system 100, the friction clutch 1 is engaged at a first engagement velocity higher than the conventional engagement velocity, V12 (phantom line in FIG. 2), at which the clutch is half-engaged, until the magnetostrictive sensor 71 detects the start of power transmission over the friction clutch 1 (before detecting the point to start engaging the clutch). The engagement velocity is then changed to engage the friction clutch 1 at a second engagement velocity lower than the first engagement velocity, when the magnetostrictive sensor 71 detects the start of power transmission by the friction clutch 1 such that the friction clutch 1 starts transmitting power after no power (torque) transmitted by the friction clutch 1 (with the friction clutch 1 disconnected) and the power transmissibility is gradually enhanced.

The clutch engagement control system 100 can control drive velocity of the actuator 3 for displacing the pressure plate 31, clamping together the inner driver 27 and the friction plates, or the plural friction discs 25 and the plural clutch plates 29, on which frictional force to transmit torque over the friction clutch 1 is generated, in the direction in which the friction plates are engaged In other words, it controls leftward displacement velocity of the piston 43 included in the actuator 3 in FIG. 4.

Under the control described above, the piston 43 is displaced leftward in FIG. 1 such that the pressure plate 31 is displaced leftward in FIG. 1 (in the direction in which the friction discs 25 and the clutch plates 29 are clamped) at the first engagement velocity that causes less shock even at the start of engagement of the friction clutch 1, until the magnetostrictive sensor 71 detects the start of the engagement of the friction clutch 1 (the start of power transmission over the friction clutch 1).

In addition, under the above control, the piston 43 is displaced leftward in FIG. 1 such that the pressure plate 31 is accordingly displaced leftward in FIG. 1 at the second engagement velocity (such as engagement velocity at which the friction clutch 1 is half-engaged) lower than the first engagement velocity, when the magnetostrictive sensor 71 detects the start of the engagement of the friction clutch 1 (the start of power transmission over the friction clutch 1).

Displacement velocity of the cylinder 43 of the actuator 3 is controlled based on the displacement velocity of the output shaft 61 of the small actuator 59 in the embodiment described above.

Figure 2:
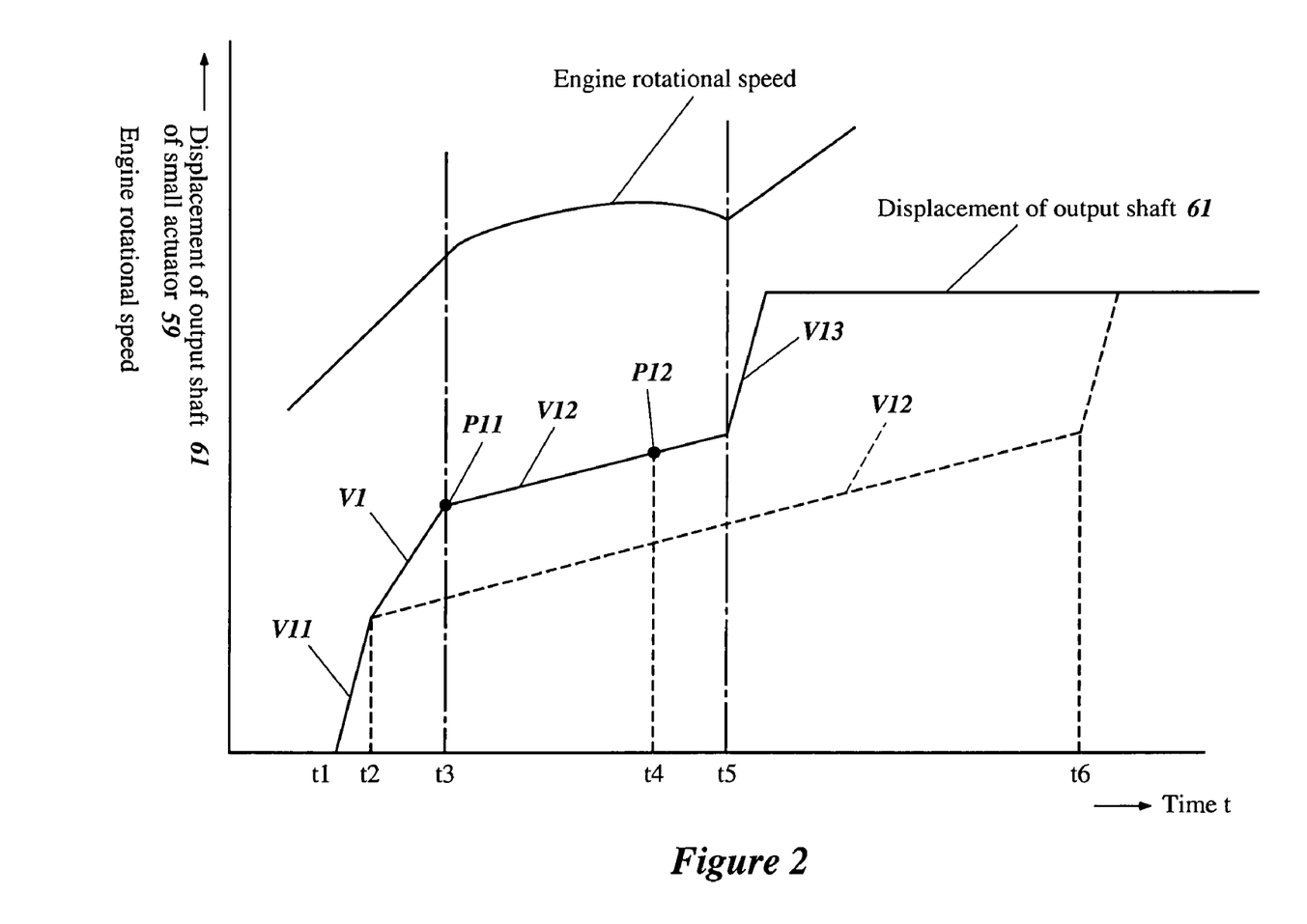
FIG. 2 illustrates an example of engagement velocity at which a friction clutch is reengaged by the clutch engagement control system.

Description will further be made of operations of the clutch engagement control system 100 in FIG. 2.

The horizontal axis of FIG. 2 represents elapsed time just as time is shown in FIG. 5. The vertical axis of FIG. 2 also represents displacement of the output shaft 61 of the small actuator 59 as shown in FIG. 5. In FIG. 2, the vertical axis additionally represents engine rotational speed.

For example, when the friction clutch I is reengaged to start the motorcycle 1, the output shaft 61 starts to be displaced rightward in FIG. 4 at time t1 and continues to be displaced at relatively high velocity, V11, until time t2, which is the same velocity as in the case of the conventional clutch engagement control system 200 shown in FIG. 5.

The displacement velocity of the output shaft 61 is then decreased at time t2 to velocity V1, at which the output shaft 61 is displaced rightward in FIG. 4, such that the pressure plate 31 is accordingly displaced leftward in FIG. 1 at the first engagement velocity that causes less shock even at the start of engagement of the friction clutch 1.

For example, when the friction clutch 1 is reengaged to start the motorcycle, the output shaft 61 starts to be displaced rightward in FIG. 4 at time t1 and continues to be displaced at relatively high velocity, V11, until time t2, which is the same velocity as in the case of the conventional clutch engagement control system 200 shown in FIG. 5.

Continuing to displace the output shaft 61 rightward in FIG. 4 at velocity V12 allows the friction discs 25 and the pressure plates 29 to be firmly clamped between the pressing portion 31B of the pressure plate 31 and the pressing portion 27B of the inner driver 27. The point at which the clutch is fully engaged with no slipping made therebetween, P12, is reached at t4. The output shaft 61 is then displaced rightward in FIG. 1 at increased velocity, V13, at time t5 after a predetermined time period.

The engagement velocity, V1, V12 and V13 shown in FIG. 2 can be the same engagement velocity for the conventional clutch engagement control system 200 shown in FIG. 5, V1, V12 and V13.

FIG. 2 illustrates operating conditions of the output shaft 61 with the conventional clutch engagement control system 200 by dashed lines. In the conventional clutch engagement control system 200, the output shaft 61 is gradually displaced at velocity V12 between times t2 and t6.

Thus, it should be understood that the clutch engagement control system 100 according to the embodiment of the present invention can reduce the time required for engaging the friction clutch 1 by the difference between times t6 and t5 compared to the conventional clutch engagement control system 200.

According to the clutch engagement control system 100, the friction clutch 1 is reengaged at the first engagement velocity, which is relatively high, until engagement of the friction clutch 1 starts (start transmitting power), and the engagement velocity is changed to the second engagement velocity lower than the first engagement velocity after the engagement of the friction clutch 1 started. This results in a moderate enhancement of power transmissibility, which reduces time required for engaging the friction clutch 1.

The clutch engagement control system 100 also employs engagement velocity that causes less shock even at the start of engagement of the friction clutch 1 as the first engagement velocity, allowing reduction in shock caused by the friction clutch engagement.

The magnetostrictive sensor 71 in the clutch engagement control system 100 detects the start of engagement of the friction clutch 1 and changes the engagement velocity of the friction clutch 1 based on the detection results. This allows precise detection of the point to start engaging the friction clutch 1 even when this point varies depending on temperature while allowing reduction in time required for engaging the friction clutch 1.

The clutch engagement control system 100 detects the point at which the friction clutch 1 starts to engage by means of the magnetostrictive sensor 71. However, at least either one of the magnetostrictive sensor 71, a magnetostrictive sensor 73 and a magnetostrictive sensor 75 both shown in FIG. 1, and a chain tension detecting sensor 81 shown in FIG. 3 may be used to detect the point at which the friction clutch 1 begins to engage.

The magnetostrictive sensor 73 can detect torque generated on the counter shaft 9 interlocked with the mission shaft 7 via the multistage transmission 5 to receive torque transmission. The sensor 73 can be placed on the end of the countershaft 9 protruding outward of the engine gearcase CS1. Here, the position where the magnetostrictive sensor 73 is placed is not limited to the position described above as long as the magnetostrictive sensor 73 can detect torque generated on the countershaft 9.

The magnetostrictive sensor 75 can be interlocked with the countershaft 9 via a chain 19, and can detect torque generated on the rear wheel shaft 15 transmitting drive torque to the rear wheel 13.

Figure 3:
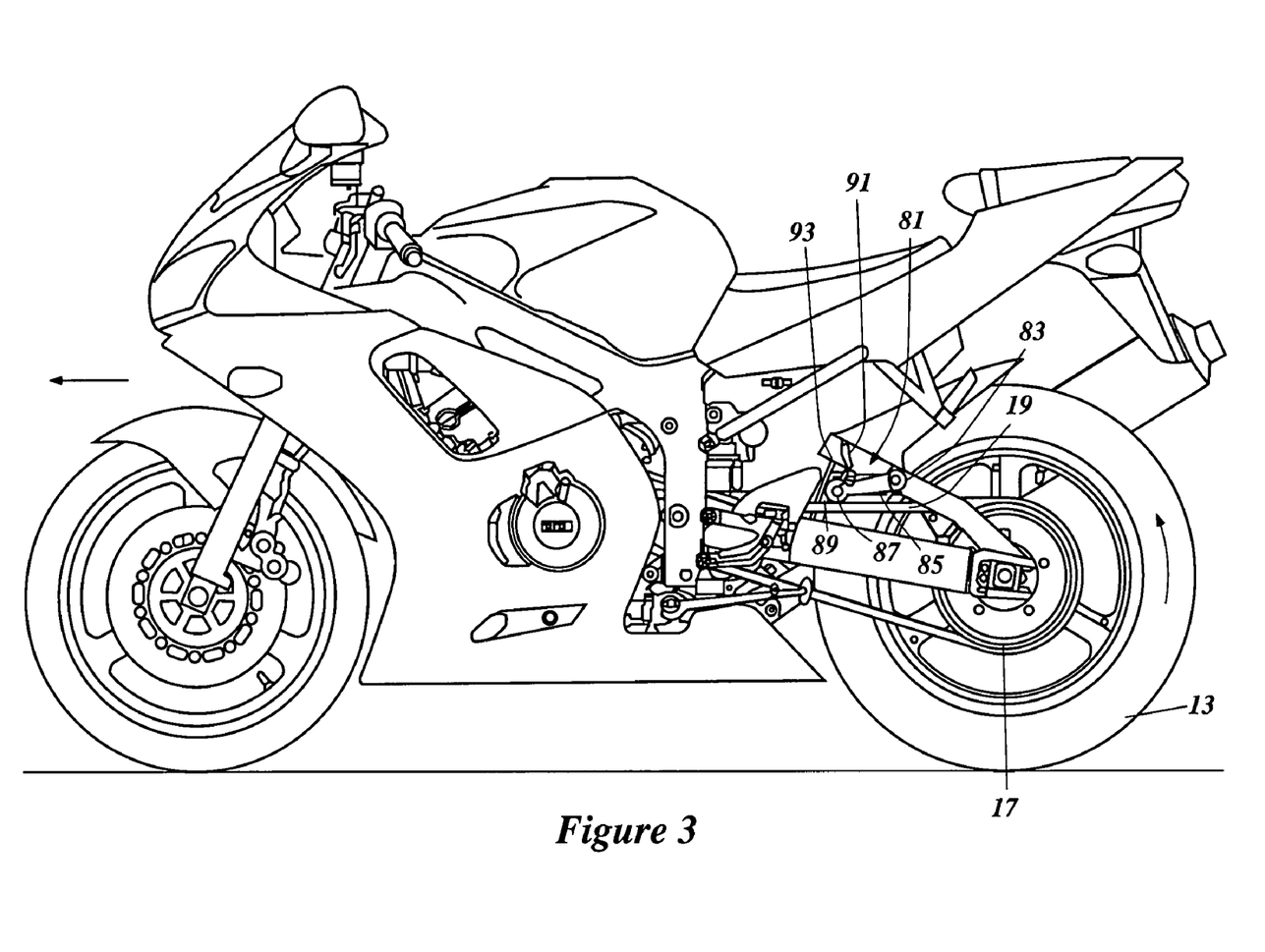
FIG. 3 illustrates a chain tension detecting sensor mounted to a motorcycle body.

The chain tension detecting sensor 81 detects the tension in the upper portion of the chain 19 wound around the countershaft sprocket 11 and the rear wheel sprocket 17 to transmit torque to the rear wheel 13 as shown in FIG. 3.

Since no or an insubstantial amount of tension may be applied to the chain 19 in the state that the friction clutch 1 is disengaged and no torque is transmitted from the countershaft 9 to the rear wheel shaft 17, the upper middle part of the chain 19 (FIG. 3) is loosened and may sag downwardly.

When engagement of the friction clutch 1 starts under this condition, torque starts to be transmitted from the countershaft 9 to the rear wheel shaft 15, which results in tension applied to the chain 19. This causes the upper middle part of the chain 19, which may have been previously loosened and sagging downwardly, to be stretched, in other words, pulled generally straight, thereby moving it upwardly, as viewed in FIG. 3.

The chain tension detecting sensor 81 can thus detect the start of engagement of the friction clutch 1 by detecting the movements of the chain 19.

Description will here be made of configuration of the chain tension detecting sensor 81.

The chain tension detecting sensor 81 can comprise an arm member 85 having one end rotatably mounted to a motorcycle frame via a pin 83 on a surface perpendicular to the rotational axis of the rear wheel sprocket 17. A circular roller 89 can be mounted to the other end of the arm member 85 via a pin 87 so also to be rotatable around the rotational axis parallel to the rotational axis of the rear wheel sprocket 17. A pressing member 91 can have one end rotatably mounted to the motorcycle frame and the other end rotatably mounted to the middle part of the arm member 85. Compression springs 93 can be used to bias the roller 89 to press against the chain 19 in the longitudinal direction.

When engagement of the friction clutch 1 starts, tension is applied to the chain 19, which allows the upper middle part of the chain 19 to be stretched and thus raised upwardly. The arm member 85 then rotates upward around the pin 83, which is detected by a limit switch (not shown) or a proximity switch (not shown).

In the above embodiment, the rear wheel 13 is driven by using the chain 19, however, a belt such as a timing belt, e.g., a toothed belt, can be used instead of the chain 19.

A bar-shaped drive shaft having bevel gears integrally provided on its both ends can also be substituted for the chain or belt to transmit torque from the countershaft 9 to the rear wheel shaft 15 to drive the rear wheel 13. In this case, the magnetostrictive sensor can be configured to detect torque generated on the bar-shaped drive shaft to detect the start of engagement of the friction clutch 1.

In FIG. 2, where any of the above-described embodiments are used, the engine rotational speed can increase at a predetermined rate until time t3 corresponding to the point at which the clutch begins to be engaged, P11. The rate of increase of engine speed slightly decreases due to the engine load caused by the start of engagement of the friction clutch 1 after time t3.

Means for detecting the engine rotational speed (crankshaft rotational speed) can be provided to determine the point to start engaging the friction clutch 1 based on variations in rate of change of the engine rotational speed as described above and to change the engagement velocity of the friction clutch 1.

The description is made of the example in which the motorcycle starts in the above embodiment of the present invention. However, substantially the same control can be performed during gear shifting by means of the multistage transmission 5.

According to the above embodiment, the engagement velocity of the friction clutch 1 can be decreased immediately after the magnetostrictive sensor 71 detected the start of engagement of the friction clutch 1. However, in some embodiments, the engagement velocity of the friction clutch 1 may be decreased after a short predetermined time period in the event that the magnetostrictive sensor 71 detects the start of engagement of the friction clutch 1.

Torque generated on the mission shaft 7 may be too low to be detected by the magnetostrictive sensor 71 even though engagement of the friction clutch 1 has already started. Thus, the magnetostrictive sensor 71 detects the start of engagement of the friction clutch at time a little later than the engagement of the friction clutch 1 actually started, although this timing also depends on detection accuracy for the magnetostrictive sensor 71.

In addition, the rotational speed of the rotational shaft of the gear 21, which is directly connected to the engine crankshaft, can be detected. The rotational speed of the rotational shaft of the mission shaft 7, which is connected to the engine crankshaft via the friction clutch 1, can also be detected. These two detected rotational speeds can be compared to each other, and detecting that no slipping or little slipping is made between the friction discs 25 and the clutch plates 29 of the friction clutch 1 based on the result of the comparison. Thus, the point at which the friction clutch 1 is fully engaged can also be detected.

The output shaft 61 of the small actuator 59 shown in FIG. 1 can be displaced rightward in FIG. 1 at velocity V13 shown in FIG. 2 immediately after the full engagement of the friction clutch 1 was detected. As a result, there is no time required between times t4 and t5 shown in FIG. 2, and thereby the time required for engaging the friction clutch 1 can be further reduced.

Also as shown in FIG. 2, in the clutch engagement control system 100, time t5 is calculated by a timer control based on time t3 at which the point to start engaging the clutch, P11, is reached. The output shaft 61 of the small actuator 59 can be adapted to be displaced at high displacement velocity, V13, by determining that the friction clutch 1 is fully engaged at the time t5. However, the time t5 may be set earlier than time t4 at which the point to fully engage the clutch, P12, is reached, for example, to time at which the friction discs 25 and the clutch plates 29 of the friction clutch 1 slip at low velocity even though the friction clutch 1 has not been fully engaged. This also allows reduction in time required for engaging the friction clutch 1.

In the above embodiment, controlling displacement velocity of the pressure plate 31 of the friction clutch 1 by means of the small actuator 59 and the actuator 3 allows the engagement velocity of the friction clutch 1 to be controlled. However, any method may be employed if the method is configured to control displacement velocity of the pressure plate 31.

The clutch engagement control system 100 as the embodiment of the present invention can be employed for clutch engagement control for motorcycles with full automatic or semi-automatic transmissions.

The clutch engagement control system 100 as the embodiment of the present invention can also be employed for vehicles or industrial machines (including automobiles, tractors and bulldozers) with the clutch engagement control system other than for motorcycles.

Furthermore, in FIG. 2, the displacement velocities of the output shaft 61 of the small actuator 59, V1 and V12, can remain constant ("0" acceleration), and accordingly the displacement velocity of the pressure plate 31 of the friction clutch 1 can also remain constant. However, they are not necessarily constant but may be changed to the extent that velocity V1 is higher than velocity V12 and accordingly the straight lines shown in FIG. 2 can be arbitrary curves.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above, but should be determined only by a fair reading of the claims that follow.

The invention claimed is:

1. A clutch control system for engaging a friction clutch with an actuator, wherein the friction clutch includes a power input configured to receive rotational shaft power and a power output configured to transfer power from the input to a down-stream rotating shaft, the system comprising:
    control means configured to control an engagement velocity of the actuator, wherein the engagement velocity is determined based on a signal detected by a first detecting means for detecting a torque and by a signal detected by a second detecting means for detecting a difference between two rotational speeds, wherein the first detecting means is configured to detect a torque on the output of the friction clutch.

2. The clutch control system according to claim 1, wherein the clutch control system is configured to at least one of;
    (a) control the engagement velocity of the actuator based on the signal of the first detecting means until a start of power transmission is detected; and
    (b) control the engagement velocity of the actuator based on the signal of the second detecting means after the start of power transmission is detected.

3. The clutch control system according to claim 1, wherein the clutch control system is configured to change the engagement velocity of the actuator from a first engagement velocity to a second engagement velocity upon detection of a start of power transmission by the first detecting means, wherein the first engagement velocity is larger than the second engagement velocity.

4. The clutch control system according to claim 3, wherein the clutch control system is configured to change the engagement velocity of the actuator from a second engagement velocity to a third engagement velocity upon detection of a full engagement of the friction clutch by the second detecting means, wherein the third engagement velocity is larger than the second engagement velocity.

5. The clutch control system according to claim 3, wherein the clutch control system is configured to change the engagement velocity of the actuator from a second engagement velocity to a third engagement velocity upon detection of a condition wherein the friction discs and the clutch plates of the friction clutch slide at low velocity before the friction clutch has been fully engaged, wherein the third engagement velocity is larger than the second engagement velocity.

6. The clutch control system according to claim 3, wherein the second engagement velocity is a velocity of the actuator just after the change of velocity from the first velocity to the second velocity.

7. The clutch control system according to claim 3, wherein the first engagement velocity represents a velocity of the actuator just before the change of velocity.

8. A clutch control system for engaging a friction clutch with an actuator, wherein the friction clutch includes a power input configured to receive rotational shaft power and a power output configured to transfer power from the input to a down-stream rotating shaft, comprising:
   detecting means for detecting a state of power transmission through the friction clutch, and
   control means configured to control the actuator so as to engage the friction clutch at first engagement velocity until the detecting means detects a start of the power transmission, and to change the engagement velocity to second engagement velocity when the detecting means detects the start of the power transmission, wherein the detecting means is configured to detect a torque on the output of the friction clutch.

9. The clutch control system according to claim 8, wherein the second engagement velocity is lower than said first engagement velocity.

10. The clutch control system according to claim 8, wherein the friction clutch transmits torque from a crankshaft of an engine to a first shaft of a transmission, wherein the detecting means is configured to detect the start of the power transmission through the friction clutch with at least one of a first torque sensor configured to detect torque applied to the first shaft, a second torque sensor for detecting torque applied to a countershaft interlocked with the first shaft via the transmission, a third torque sensor interlocked with the countershaft via a chain or belt for detecting torque applied to a rear wheel shaft, and a deflection detecting sensor for detecting a chain or a belt defection.

11. The clutch control system according to claim 8, wherein the friction clutch is configured to transmit torque from a crankshaft of an engine to a mission shaft in a transmission, wherein the detecting means is configured to detect the start of the power transmission through the friction clutch with a first torque sensor for detecting torque applied to a bar-shaped drive shaft configured to transmit torque from a countershaft interlocked with the mission shaft via the transmission to a rear wheel shaft of a vehicle.

12. The clutch control system according to claim 8, wherein the control means is configured to control a displacement velocity of the actuator for displacing a pressure plate clamping a friction plate on which frictional force for transmitting torque through the friction clutch is generated, in a direction in which the friction plate is engaged.

13. The clutch control system according to claim 8, wherein the first engagement velocity is chosen to cause less shock when the friction clutch starts transmitting power while the second engagement velocity is chosen to allow the friction clutch to be half-engaged.

14. The clutch control system according to claim 8, wherein the control means is configured to compare a rotational speed of a mission shaft of a transmission connected to the clutch and a rotational speed of a gear connected to an engine crankshaft, the crankshaft also being connected to the clutch.

15. The clutch control system according to claim 8, wherein the control means is configured to change the engagement velocity of the clutch from the second engagement velocity to a third engagement velocity when the detection means detects that the friction clutch is fully engaged.

16. The clutch control system according to claim 15, wherein said third engagement velocity is higher than said second engagement velocity.

17. The clutch control system according to claim 8 in combination with a vehicle comprising an engine, a drive shaft driven by the engine and connectable to a drive wheel of the vehicle, the friction clutch being interposed between the engine and the drive shaft, wherein the clutch control system is configured for engaging the friction clutch.

18. A clutch control system for engaging a friction clutch with an actuator, wherein the friction clutch includes a power input configured to receive rotational shaft power and a power output configured to transfer power from the input to a down-stream rotating shaft, the system comprising a controller configured to control an engagement velocity of the actuator, and configured to determine an engagement velocity based on a signal detected by a first sensor configured to detect a torque and by a signal detected by a second sensor configured to detect a difference between two rotational speeds, wherein the first sensor is configured to detect a torque on the output of the friction clutch.

* * * * *

UNITED STATES PATENT AND TRADEMARK OFFICE
CERTIFICATE OF CORRECTION

PATENT NO. : 7,044,281 B2  Page 1 of 1
APPLICATION NO. : 10/985230
DATED : May 16, 2006
INVENTOR(S) : Makoto Kosugi et al.

It is certified that error appears in the above-identified patent and that said Letters Patent is hereby corrected as shown below:

In Column 1, Line 55, after "clutch", please insert --.--

In Column 3, Line 43, please delete "clutch I" and insert --clutch 1--

In Column 6, Line 31-32, please delete "clutch I" and insert --clutch 1--

In Column 6, Line 62, please delete "clutch I" and insert --clutch 1--

In Column 7, Line 15, please delete "til" and insert --t11--

In Column 7, Line 16, please delete "Vii," and insert --V11,--

In Column 10, Line 62, please delete "clutch I" and insert --clutch 1--

In Column 11, Line 22, please delete "V1," and insert --V11,--

In Column 11, Line 25, please delete "V1," and insert --V11,--

Signed and Sealed this

Nineteenth Day of December, 2006

JON W. DUDAS
*Director of the United States Patent and Trademark Office*